(12) United States Patent
Hillan et al.

(10) Patent No.: US 8,803,474 B2
(45) Date of Patent: Aug. 12, 2014

(54) OPTIMIZATION OF WIRELESS POWER DEVICES

(75) Inventors: John Hillan, Alton (GB); Stephen Frankland, Horsham (GB)

(73) Assignee: QUALCOMM Incorporated, San Diego, CA (US)

( * ) Notice: Subject to any disclaimer, the term of this patent is extended or adjusted under 35 U.S.C. 154(b) by 465 days.

(21) Appl. No.: 12/713,091

(22) Filed: Feb. 25, 2010

(65) Prior Publication Data

US 2010/0244576 A1    Sep. 30, 2010

Related U.S. Application Data

(60) Provisional application No. 61/163,383, filed on Mar. 25, 2009, provisional application No. 61/164,355, filed on Mar. 27, 2009, provisional application No. 61/164,744, filed on Mar. 30, 2009, provisional application No. 61/186,770, filed on Jun. 12, 2009.

(51) Int. Cl.
*H02J 7/00*    (2006.01)

(52) U.S. Cl.
USPC .......................................... 320/108; 320/114

(58) Field of Classification Search
USPC ........................................................ 320/108
See application file for complete search history.

(56) References Cited

U.S. PATENT DOCUMENTS

| | | | | |
|---|---|---|---|---|
| 6,037,743 A * | 3/2000 | White et al. | .................. | 320/103 |
| 6,750,560 B1 | 6/2004 | Nishimoto et al. | | |
| 2008/0058029 A1 | 3/2008 | Sato et al. | | |
| 2008/0116847 A1 * | 5/2008 | Loke et al. | .................... | 320/108 |
| 2008/0303479 A1 * | 12/2008 | Park et al. | .................... | 320/108 |
| 2009/0058361 A1 * | 3/2009 | John | ............................. | 320/128 |
| 2009/0284369 A1 | 11/2009 | Toncich et al. | | |
| 2009/0286475 A1 | 11/2009 | Toncich et al. | | |
| 2009/0286476 A1 | 11/2009 | Toncich et al. | | |

FOREIGN PATENT DOCUMENTS

| | | |
|---|---|---|
| CN | 101136561 A | 3/2008 |
| JP | H06054453 A | 2/1994 |
| JP | 08304518 | 11/1996 |
| JP | 2000287375 | 10/2000 |
| JP | 2001238372 A | 8/2001 |
| JP | 2003111312 A | 4/2003 |
| JP | 2008206327 A | 9/2008 |
| JP | 2010141977 A | 6/2010 |
| WO | 0207173 A1 | 1/2002 |

OTHER PUBLICATIONS

International Search Report and Written Opinion—PCT/US2010/028737—International Search Authority, European Patent Office,Jan. 31, 2011.

* cited by examiner

*Primary Examiner* — Drew A Dunn
*Assistant Examiner* — Robert Grant
(74) *Attorney, Agent, or Firm* — Knobbe Martens Olson & Bear LLP

(57) ABSTRACT

Exemplary embodiments are directed to wireless power. A chargeable device may comprise receive circuitry for coupling to a receive antenna. The receive circuitry may comprise at least one sensor to sense one or more parameters associated with the chargeable device. Further, the receive circuitry may comprise a tuning controller operably coupled to the at least one sensor to generate one or more tuning values in response to the one or more sensed parameters. Additionally, the receive circuitry may comprise a matching circuit operably coupled to the tuning controller for tuning the receive antenna according to the one or more tuning values.

35 Claims, 13 Drawing Sheets

OPTIMIZATION OF WIRELESS POWER DEVICES

CLAIM OF PRIORITY UNDER 35 U.S.C. §119

This application claims priority under 35 U.S.C. §119(e) to:

U.S. Provisional Patent Application 61/163,383 entitled "WIRELESS ENERGY EXTRACTION FOR POWER CONSUMPTION" filed on Mar. 25, 2009, the disclosure of which is hereby incorporated by reference in its entirety.

U.S. Provisional Patent Application 61/164,355 entitled "WIRELESS POWER ENERGY TRANSFER OPTIMIZATION" filed on Mar. 27, 2009, the disclosure of which is hereby incorporated by reference in its entirety.

U.S. Provisional Patent Application 61/164,744 entitled "ANTENNA TUNING BASED ON FEEDBACK FROM CHARGING PARAMETERS" filed on Mar. 30, 2009, the disclosure of which is hereby incorporated by reference in its entirety.

U.S. Provisional Patent Application 61/186,770 entitled "REQUESTING CHANGE IN TUNING OF RF FIELD WHILE CHARGING" filed on Jun. 12, 2009, the disclosure of which is hereby incorporated by reference in its entirety.

BACKGROUND

1. Field

The present invention relates generally to wireless power, and more specifically to optimization of wireless power devices, such as wireless chargers and wirelessly chargeable devices.

2. Background

Typically, each battery powered device requires its own charger and power source, which is usually an AC power outlet. This becomes unwieldy when many devices need charging.

Approaches are being developed that use over the air power transmission between a transmitter and the device to be charged. These generally fall into two categories. One is based on the coupling of plane wave radiation (also called far-field radiation) between a transmit antenna and receive antenna on the device to be charged which collects the radiated power and rectifies it for charging the battery. Antennas are generally of resonant length in order to improve the coupling efficiency. This approach suffers from the fact that the power coupling falls off quickly with distance between the antennas. So charging over reasonable distances (e.g., >1-2 m) becomes difficult. Additionally, since the system radiates plane waves, unintentional radiation can interfere with other systems if not properly controlled through filtering.

Other approaches are based on inductive coupling between a transmit antenna embedded, for example, in a "charging" mat or surface and a receive antenna plus rectifying circuit embedded in the host device to be charged. This approach has the disadvantage that the spacing between transmit and receive antennas must be very close (e.g. mms). Though this approach does have the capability to simultaneously charge multiple devices in the same area, this area is typically small, hence the user must locate the devices to a specific area.

A need exists for devices configured to optimize wireless power charging. More specifically, a need exists for a wirelessly chargeable device configured to enable for optimal an amount of power received thereby. Further, a need exists for a wireless charger configured to modify a transmitted RF field to enable for an enhanced charging efficiency with a chargeable device.

DETAILED DESCRIPTION

The word "exemplary" is used herein to mean "serving as an example, instance, or illustration." Any embodiment described herein as "exemplary" is not necessarily to be construed as preferred or advantageous over other embodiments.

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well-known structures and devices are shown in block diagram form in order to avoid obscuring the novelty of the exemplary embodiments presented herein.

The words "wireless power" is used herein to mean any form of energy associated with electric fields, magnetic fields, electromagnetic fields, or otherwise that is transmitted between from a transmitter to a receiver without the use of physical electromagnetic conductors.

Figure 1:
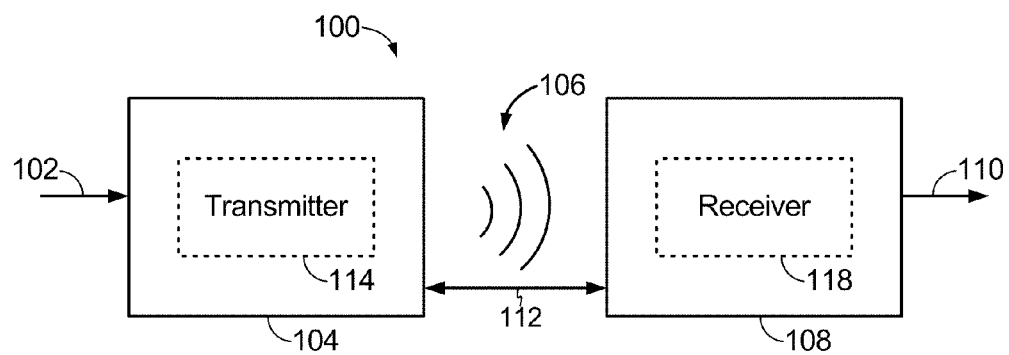
FIG. 1 shows a simplified block diagram of a wireless power transfer system.

FIG. 1 illustrates a wireless transmission or charging system 100, in accordance with various exemplary embodiments of the present invention. Input power 102 is provided to a transmitter 104 for generating a radiated field 106 for providing energy transfer. A receiver 108 couples to the radiated field 106 and generates an output power 110 for storing or consumption by a device (not shown) coupled to the output power 110. Both the transmitter 104 and the receiver 108 are separated by a distance 112. In one exemplary embodiment, transmitter 104 and receiver 108 are configured according to a mutual resonant relationship and when the resonant frequency of receiver 108 and the resonant frequency of transmitter 104 are very close, transmission losses between the transmitter 104 and the receiver 108 are minimal when the receiver 108 is located in the "near-field" of the radiated field 106.

Transmitter 104 further includes a transmit antenna 114 for providing a means for energy transmission and receiver 108 further includes a receive antenna 118 for providing a means for energy reception. The transmit and receive antennas are sized according to applications and devices to be associated therewith. As stated, an efficient energy transfer occurs by coupling a large portion of the energy in the near-field of the transmitting antenna to a receiving antenna rather than propagating most of the energy in an electromagnetic wave to the far field. When in this near-field a coupling mode may be developed between the transmit antenna 114 and the receive antenna 118. The area around the antennas 114 and 118 where this near-field coupling may occur is referred to herein as a coupling-mode region.

Figure 2:
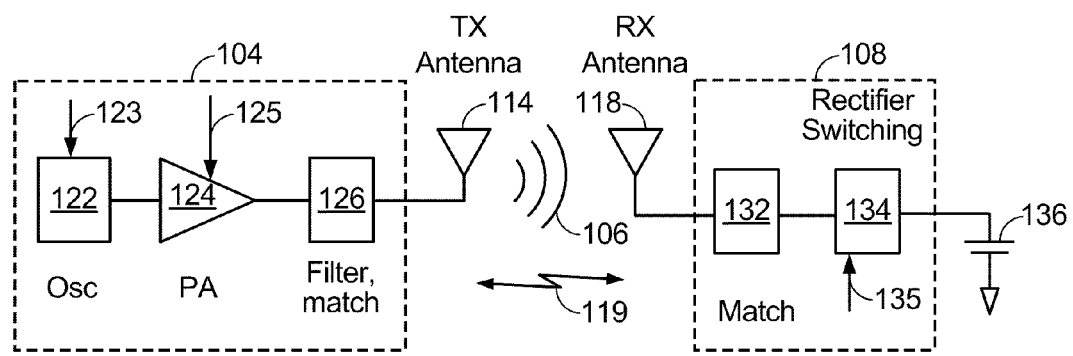
FIG. 2 shows a simplified schematic diagram of a wireless power transfer system.

FIG. 2 shows a simplified schematic diagram of a wireless power transfer system. The transmitter 104 includes an oscillator 122, a power amplifier 124 and a filter and matching circuit 126. The oscillator is configured to generate at a desired frequency, which may be adjusted in response to adjustment signal 123. The oscillator signal may be amplified by the power amplifier 124 with an amplification amount responsive to control signal 125. The filter and matching circuit 126 may be included to filter out harmonics or other unwanted frequencies and match the impedance of the transmitter 104 to the transmit antenna 114.

The receiver 108 may include a matching circuit 132 and a rectifier and switching circuit 134 to generate a DC power output to charge a battery 136 as shown in FIG. 2 or power a device coupled to the receiver (not shown). The matching circuit 132 may be included to match the impedance of the receiver 108 to the receive antenna 118. The receiver 108 and transmitter 104 may communicate on a separate communication channel 119 (e.g., Bluetooth, zigbee, cellular, etc).

Figure 3A:
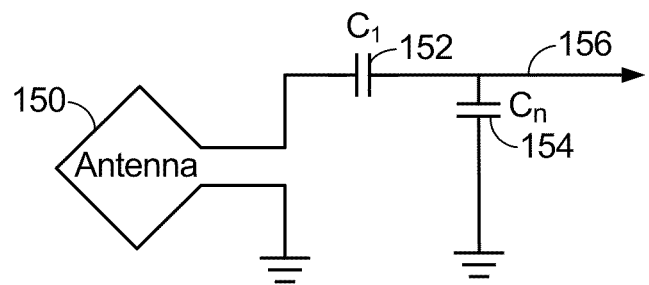
FIG. 3A illustrates a schematic diagram of a loop antenna for use in exemplary embodiments of the present invention.

As illustrated in FIG. 3A, antennas used in exemplary embodiments may be configured as a "loop" antenna 150, which may also be referred to herein as a "magnetic" antenna. Loop antennas may be configured to include an air core or a physical core such as a ferrite core. Air core loop antennas may be more tolerable to extraneous physical devices placed in the vicinity of the core. Furthermore, an air core loop antenna allows the placement of other components within the core area. In addition, an air core loop may more readily enable placement of the receive antenna 118 (FIG. 2) within a plane of the transmit antenna 114 (FIG. 2) where the coupled-mode region of the transmit antenna 114 (FIG. 2) may be more powerful.

As stated, efficient transfer of energy between the transmitter 104 and receiver 108 occurs during matched or nearly matched resonance between the transmitter 104 and the receiver 108. However, even when resonance between the transmitter 104 and receiver 108 are not matched, energy may be transferred at a lower efficiency. Transfer of energy occurs by coupling energy from the near-field of the transmitting antenna to the receiving antenna residing in the neighborhood where this near-field is established rather than propagating the energy from the transmitting antenna into free space.

The resonant frequency of the loop or magnetic antennas is based on the inductance and capacitance. Inductance in a loop antenna is generally simply the inductance created by the loop, whereas, capacitance is generally added to the loop antenna's inductance to create a resonant structure at a desired resonant frequency. As a non-limiting example, capacitor 152 and capacitor 154 may be added to the antenna to create a resonant circuit that generates resonant signal 156. Accordingly, for larger diameter loop antennas, the size of capacitance needed to induce resonance decreases as the diameter or inductance of the loop increases. Furthermore, as the diameter of the loop or magnetic antenna increases, the efficient energy transfer area of the near-field increases. Of course, other resonant circuits are possible. As another non-limiting example, a capacitor may be placed in parallel between the two terminals of the loop antenna. In addition, those of ordinary skill in the art will recognize that for transmit antennas the resonant signal 156 may be an input to the loop antenna 150.

Figure 3B:
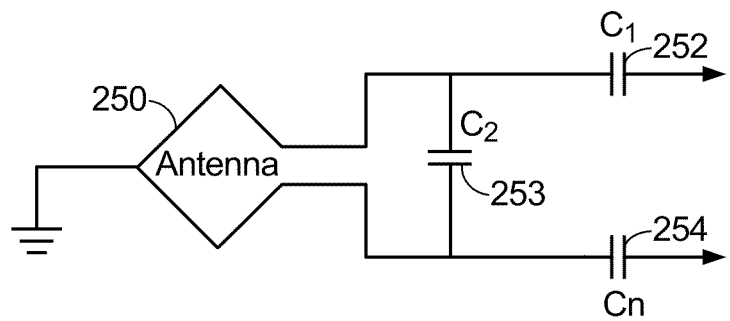
FIG. 3B illustrates an alternate embodiment of a differential antenna used in exemplary embodiments of the present invention.

FIG. 3B illustrates an alternate embodiment of a differential antenna 250 used in exemplary embodiments of the present invention. Antenna 250 may be configured as a differential coil antenna. In a differential antenna configuration, the center of antenna 250 is connected to ground. Each end of antenna 250 are connected into a receiver/transmitter unit (not shown), rather than having one end connected to ground as in FIG. 3A. Capacitors 252, 253, 254 may be added to the antenna 250 to create a resonant circuit that generates a differential resonant signal. A differential antenna configuration may be useful in situations when communication is bidirectional and transmission into the coil is required. One such situation may be for Near Field Communication (NFC) systems.

Exemplary embodiments of the invention include coupling power between two antennas that are in the near-fields of each other. As stated, the near-field is an area around the antenna in which electromagnetic fields exist but may not propagate or radiate away from the antenna. They are typically confined to a volume that is near the physical volume of the antenna. In the exemplary embodiments of the invention, magnetic type antennas such as single and multi-turn loop antennas are used for both transmit (Tx) and receive (Rx) antenna systems since magnetic near-field amplitudes tend to be higher for magnetic type antennas in comparison to the electric near-fields of an electric-type antenna (e.g., a small dipole). This allows for potentially higher coupling between the pair. Furthermore, "electric" antennas (e.g., dipoles and monopoles) or a combination of magnetic and electric antennas is also contemplated.

The Tx antenna can be operated at a frequency that is low enough and with an antenna size that is large enough to achieve good coupling (e.g., >−4 dB) to a small Rx antenna at significantly larger distances than allowed by far field and inductive approaches mentioned earlier. If the Tx antenna is sized correctly, high coupling levels (e.g., −2 to −4 dB) can be achieved when the Rx antenna on a host device is placed within a coupling-mode region (i.e., in the near-field) of the driven Tx loop antenna.

Figure 4:
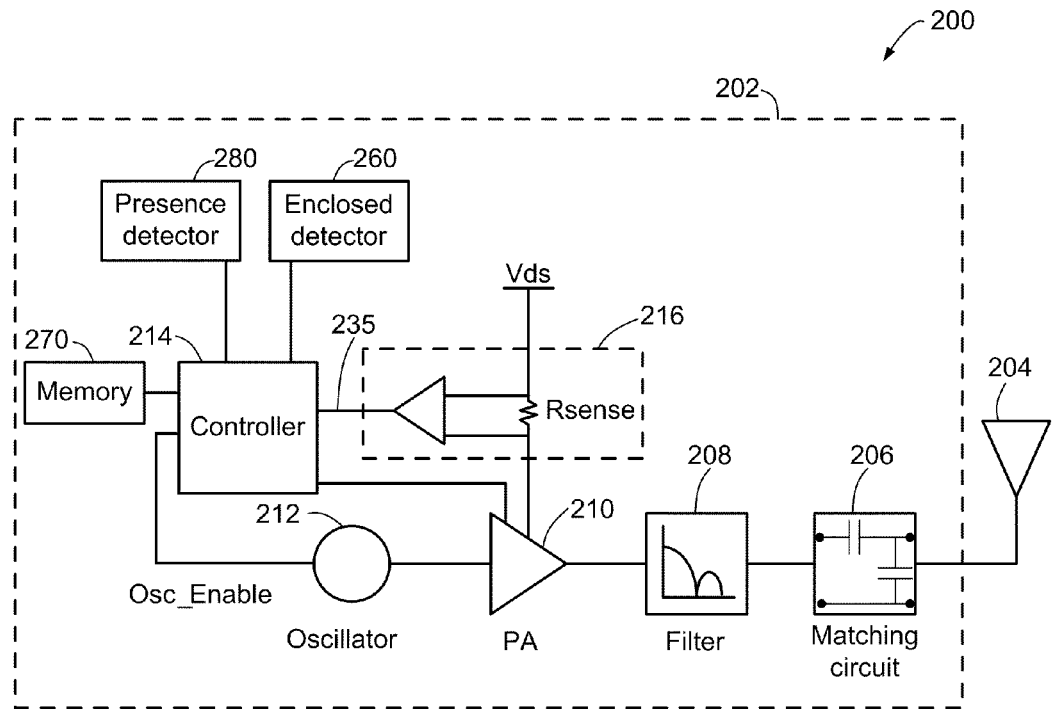
FIG. 4 is a simplified block diagram of a transmitter, in accordance with an exemplary embodiment of the present invention.

FIG. 4 is a simplified block diagram of a transmitter 200, in accordance with an exemplary embodiment of the present invention. The transmitter 200 includes transmit circuitry 202 and a transmit antenna 204. Generally, transmit circuitry 202 provides RF power to the transmit antenna 204 by providing an oscillating signal resulting in generation of near-field energy about the transmit antenna 204. By way of example, transmitter 200 may operate at the 13.56 MHz ISM band.

Exemplary transmit circuitry 202 includes a fixed impedance matching circuit 206 for matching the impedance of the transmit circuitry 202 (e.g., 50 ohms) to the transmit antenna 204 and a low pass filter (LPF) 208 configured to reduce harmonic emissions to levels to prevent self-jamming of devices coupled to receivers 108 (FIG. 1). Other exemplary embodiments may include different filter topologies, including but not limited to, notch filters that attenuate specific frequencies while passing others and may include an adaptive impedance match, that can be varied based on measurable transmit metrics, such as output power to the antenna or DC current draw by the power amplifier. Transmit circuitry 202 further includes a power amplifier 210 configured to drive an RF signal as determined by an oscillator 212. The transmit circuitry may be comprised of discrete devices or circuits, or alternately, may be comprised of an integrated assembly. An exemplary RF power output from transmit antenna 204 may be on the order of 2.5 Watts.

Transmit circuitry 202 further includes a controller 214 for enabling the oscillator 212 during transmit phases (or duty cycles) for specific receivers, for adjusting the frequency of the oscillator, and for adjusting the output power level for implementing a communication protocol for interacting with neighboring devices through their attached receivers.

The transmit circuitry 202 may further include a load sensing circuit 216 for detecting the presence or absence of active receivers in the vicinity of the near-field generated by transmit antenna 204. By way of example, a load sensing circuit 216 monitors the current flowing to the power amplifier 210, which is affected by the presence or absence of active receivers in the vicinity of the near-field generated by transmit antenna 204. Detection of changes to the loading on the power amplifier 210 are monitored by controller 214 for use in determining whether to enable the oscillator 212 for transmitting energy to communicate with an active receiver.

Transmit antenna 204 may be implemented as an antenna strip with the thickness, width and metal type selected to keep resistive losses low. In a conventional implementation, the transmit antenna 204 can generally be configured for association with a larger structure such as a table, mat, lamp or other less portable configuration. Accordingly, the transmit antenna 204 generally will not need "turns" in order to be of a practical dimension. An exemplary implementation of a transmit antenna 204 may be "electrically small" (i.e., fraction of the wavelength) and tuned to resonate at lower usable frequencies by using capacitors to define the resonant frequency. In an exemplary application where the transmit antenna 204 may be larger in diameter, or length of side if a square loop, (e.g., 0.50 meters) relative to the receive antenna, the transmit antenna 204 will not necessarily need a large number of turns to obtain a reasonable capacitance.

The transmitter 200 may gather and track information about the whereabouts and status of receiver devices that may be associated with the transmitter 200. Thus, the transmitter circuitry 202 may include a presence detector 280, an enclosed detector 290, or a combination thereof, connected to the controller 214 (also referred to as a processor herein). The controller 214 may adjust an amount of power delivered by the amplifier 210 in response to presence signals from the presence detector 280 and the enclosed detector 290. The transmitter may receive power through a number of power sources, such as, for example, an AC-DC converter (not shown) to convert conventional AC power present in a building, a DC-DC converter (not shown) to convert a conventional DC power source to a voltage suitable for the transmitter 200, or directly from a conventional DC power source (not shown).

As a non-limiting example, the presence detector 280 may be a motion detector utilized to sense the initial presence of a device to be charged that is inserted into the coverage area of the transmitter. After detection, the transmitter may be turned on and the RF power received by the device may be used to toggle a switch on the Rx device in a pre-determined manner, which in turn results in changes to the driving point impedance of the transmitter.

As another non-limiting example, the presence detector 280 may be a detector capable of detecting a human, for example, by infrared detection, motion detection, or other suitable means. In some exemplary embodiments, there may be regulations limiting the amount of power that a transmit antenna may transmit at a specific frequency. In some cases, these regulations are meant to protect humans from electromagnetic radiation. However, there may be environments where transmit antennas are placed in areas not occupied by humans, or occupied infrequently by humans, such as, for example, garages, factory floors, shops, and the like. If these environments are free from humans, it may be permissible to increase the power output of the transmit antennas above the normal power restrictions regulations. In other words, the controller 214 may adjust the power output of the transmit antenna 204 to a regulatory level or lower in response to human presence and adjust the power output of the transmit antenna 204 to a level above the regulatory level when a human is outside a regulatory distance from the electromagnetic field of the transmit antenna 204.

As a non-limiting example, the enclosed detector 290 (may also be referred to herein as an enclosed compartment detector or an enclosed space detector) may be a device such as a sense switch for determining when an enclosure is in a closed or open state. When a transmitter is in an enclosure that is in an enclosed state, a power level of the transmitter may be increased.

In exemplary embodiments, a method by which the transmitter 200 does not remain on indefinitely may be used. In this case, the transmitter 200 may be programmed to shut off after a user-determined amount of time. This feature prevents the transmitter 200, notably the power amplifier 210, from running long after wireless devices in its perimeter are fully charged. This event may be due to the failure of the circuit to detect the signal sent from either the repeater or the receive coil that a device is fully charged. To prevent the transmitter 200 from automatically shutting down if another device is placed in its perimeter, the transmitter 200 automatic shut off feature may be activated only after a set period of lack of motion detected in its perimeter. The user may be able to determine the inactivity time interval, and change it as desired. As a non-limiting example, the time interval may be longer than that needed to fully charge a specific type of wireless device under the assumption of the device being initially fully discharged.

Figure 5:
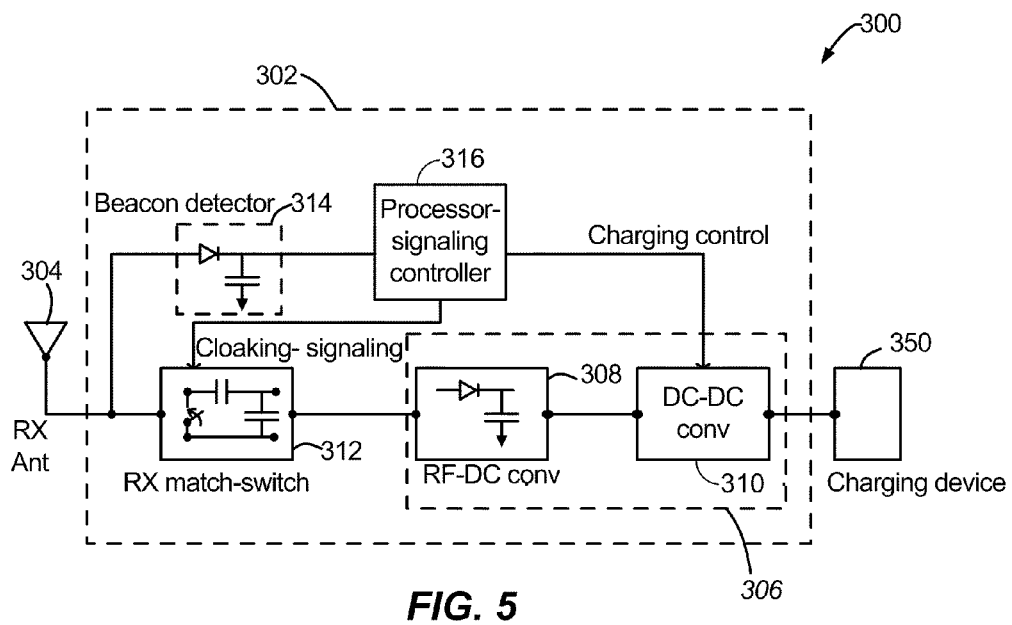
FIG. 5 is a simplified block diagram of a receiver, in accordance with an exemplary embodiment of the present invention.

FIG. 5 is a simplified block diagram of a receiver 300, in accordance with an exemplary embodiment of the present invention. The receiver 300 includes receive circuitry 302 and a receive antenna 304. Receiver 300 further couples to device 350 for providing received power thereto. It should be noted that receiver 300 is illustrated as being external to device 350 but may be integrated into device 350. Generally, energy is propagated wirelessly to receive antenna 304 and then coupled through receive circuitry 302 to device 350.

Receive antenna 304 is tuned to resonate at the same frequency, or near the same frequency, as transmit antenna 204 (FIG. 4). Receive antenna 304 may be similarly dimensioned with transmit antenna 204 or may be differently sized based upon the dimensions of the associated device 350. By way of example, device 350 may be a portable electronic device having diametric or length dimension smaller that the diameter of length of transmit antenna 204. In such an example, receive antenna 304 may be implemented as a multi-turn antenna in order to reduce the capacitance value of a tuning capacitor (not shown) and increase the receive antenna's impedance. By way of example, receive antenna 304 may be placed around the substantial circumference of device 350 in order to maximize the antenna diameter and reduce the number of loop turns (i.e., windings) of the receive antenna and the inter-winding capacitance.

Receive circuitry 302 provides an impedance match to the receive antenna 304. Receive circuitry 302 includes power conversion circuitry 306 for converting a received RF energy source into charging power for use by device 350. Power conversion circuitry 306 includes an RF-to-DC converter 308 and may also in include a DC-to-DC converter 310. RF-to-DC converter 308 rectifies the RF energy signal received at receive antenna 304 into a non-alternating power while DC-to-DC converter 310 converts the rectified RF energy signal into an energy potential (e.g., voltage) that is compatible with device 350. Various RF-to-DC converters are contemplated, including partial and full rectifiers, regulators, bridges, doublers, as well as linear and switching converters.

Receive circuitry 302 may further include switching circuitry 312 for connecting receive antenna 304 to the power conversion circuitry 306 or alternatively for disconnecting the power conversion circuitry 306. Disconnecting receive antenna 304 from power conversion circuitry 306 not only suspends charging of device 350, but also changes the "load" as "seen" by the transmitter 200 (FIG. 2).

As disclosed above, transmitter 200 includes load sensing circuit 216 which detects fluctuations in the bias current provided to transmitter power amplifier 210. Accordingly, transmitter 200 has a mechanism for determining when receivers are present in the transmitter's near-field.

When multiple receivers 300 are present in a transmitter's near-field, it may be desirable to time-multiplex the loading and unloading of one or more receivers to enable other receivers to more efficiently couple to the transmitter. A receiver may also be cloaked in order to eliminate coupling to other nearby receivers or to reduce loading on nearby transmitters. This "unloading" of a receiver is also known herein as a "cloaking." Furthermore, this switching between unloading and loading controlled by receiver 300 and detected by transmitter 200 provides a communication mechanism from receiver 300 to transmitter 200 as is explained more fully below. Additionally, a protocol can be associated with the switching which enables the sending of a message from receiver 300 to transmitter 200. By way of example, a switching speed may be on the order of 100 μsec.

In an exemplary embodiment, communication between the transmitter and the receiver refers to a device sensing and charging control mechanism, rather than conventional two-way communication. In other words, the transmitter uses on/off keying of the transmitted signal to adjust whether energy is available in the near-filed. The receivers interpret these changes in energy as a message from the transmitter. From the receiver side, the receiver uses tuning and de-tuning of the receive antenna to adjust how much power is being accepted from the near-field. The transmitter can detect this difference in power used from the near-field and interpret these changes as a message from the receiver.

Receive circuitry 302 may further include signaling detector and beacon circuitry 314 used to identify received energy fluctuations, which may correspond to informational signaling from the transmitter to the receiver. Furthermore, signaling and beacon circuitry 314 may also be used to detect the transmission of a reduced RF signal energy (i.e., a beacon signal) and to rectify the reduced RF signal energy into a nominal power for awakening either un-powered or power-depleted circuits within receive circuitry 302 in order to configure receive circuitry 302 for wireless charging.

Receive circuitry 302 further includes processor 316 for coordinating the processes of receiver 300 described herein including the control of switching circuitry 312 described herein. Cloaking of receiver 300 may also occur upon the occurrence of other events including detection of an external wired charging source (e.g., wall/USB power) providing charging power to device 350. Processor 316, in addition to controlling the cloaking of the receiver, may also monitor beacon circuitry 314 to determine a beacon state and extract messages sent from the transmitter. Processor 316 may also adjust DC-to-DC converter 310 for improved performance.

Figure 6:
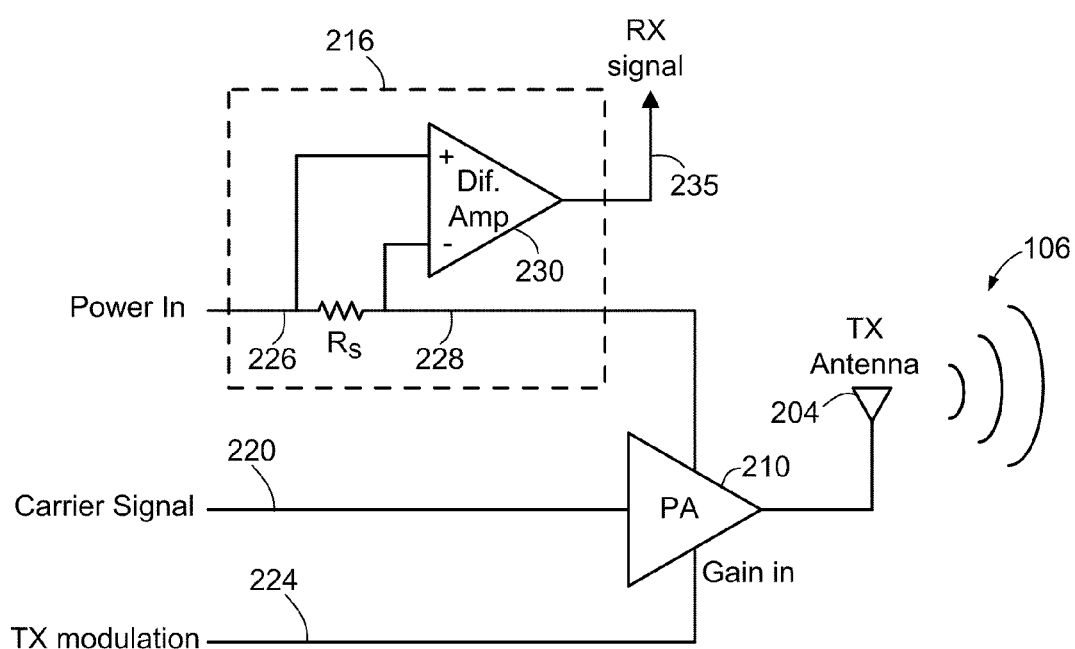
FIG. 6 shows a simplified schematic of a portion of transmit circuitry for carrying out messaging between a transmitter and a receiver.

FIG. 6 shows a simplified schematic of a portion of transmit circuitry for carrying out messaging between a transmitter and a receiver. In some exemplary embodiments of the present invention, a means for communication may be enabled between the transmitter and the receiver. In FIG. 6 a power amplifier 210 drives the transmit antenna 204 to generate the radiated field. The power amplifier is driven by a carrier signal 220 that is oscillating at a desired frequency for the transmit antenna 204. A transmit modulation signal 224 is used to control the output of the power amplifier 210.

The transmit circuitry can send signals to receivers by using an ON/OFF keying process on the power amplifier 210. In other words, when the transmit modulation signal 224 is asserted, the power amplifier 210 will drive the frequency of the carrier signal 220 out on the transmit antenna 204. When the transmit modulation signal 224 is negated, the power amplifier will not drive out any frequency on the transmit antenna 204.

The transmit circuitry of FIG. 6 also includes a load sensing circuit 216 that supplies power to the power amplifier 210 and generates a receive signal 235 output. In the load sensing circuit 216 a voltage drop across resistor $R_s$ develops between the power in signal 226 and the power supply 228 to the power amplifier 210. Any change in the power consumed by the power amplifier 210 will cause a change in the voltage drop that will be amplified by differential amplifier 230. When the transmit antenna is in coupled mode with a receive antenna in a receiver (not shown in FIG. 6) the amount of current drawn by the power amplifier 210 will change. In other words, if no coupled mode resonance exist for the transmit antenna 204, the power required to drive the radiated field will be a first amount. If a coupled mode resonance exists, the amount of power consumed by the power amplifier 210 will go up because much of the power is being coupled into the receive antenna. Thus, the receive signal 235 can indicate the presence of a receive antenna coupled to the transmit antenna 235 and can also detect signals sent from the receive antenna. Additionally, a change in receiver current draw will be observable in the transmitter's power amplifier current draw, and this change can be used to detect signals from the receive antennas.

Details of some exemplary embodiments for cloaking signals, beacon signals, and circuits for generating these signals can be seen in U.S. Utility patent application Ser. No. 12/249,873, entitled "REVERSE LINK SIGNALING VIA RECEIVE ANTENNA IMPEDANCE MODULATION" filed on Oct. 10, 2008; and in U.S. Utility patent application Ser. No. 12/249,861, entitled "TRANSMIT POWER CONTROL FOR A WIRELESS CHARGING SYSTEM" filed on Oct. 10, 2008, both herein incorporated by reference in their entirety.

Details of exemplary communication mechanisms and protocols can be seen in U.S. Utility patent application Ser. No. 12/249,866 entitled "SIGNALING CHARGING IN WIRELESS POWER ENVIRONMENT" filed on Oct. 10, 2008, the contents of which is incorporated by reference herein in its entirety.

It is noted that the term "active mode" as used herein comprises a mode of operation wherein an electronic device is actively transmitting a signal (e.g., a data signal). Further, the term "passive mode" as used herein comprises a mode of operation wherein an electronic device is capable of being detected, but is not actively transmitting a signal.

Figure 7:
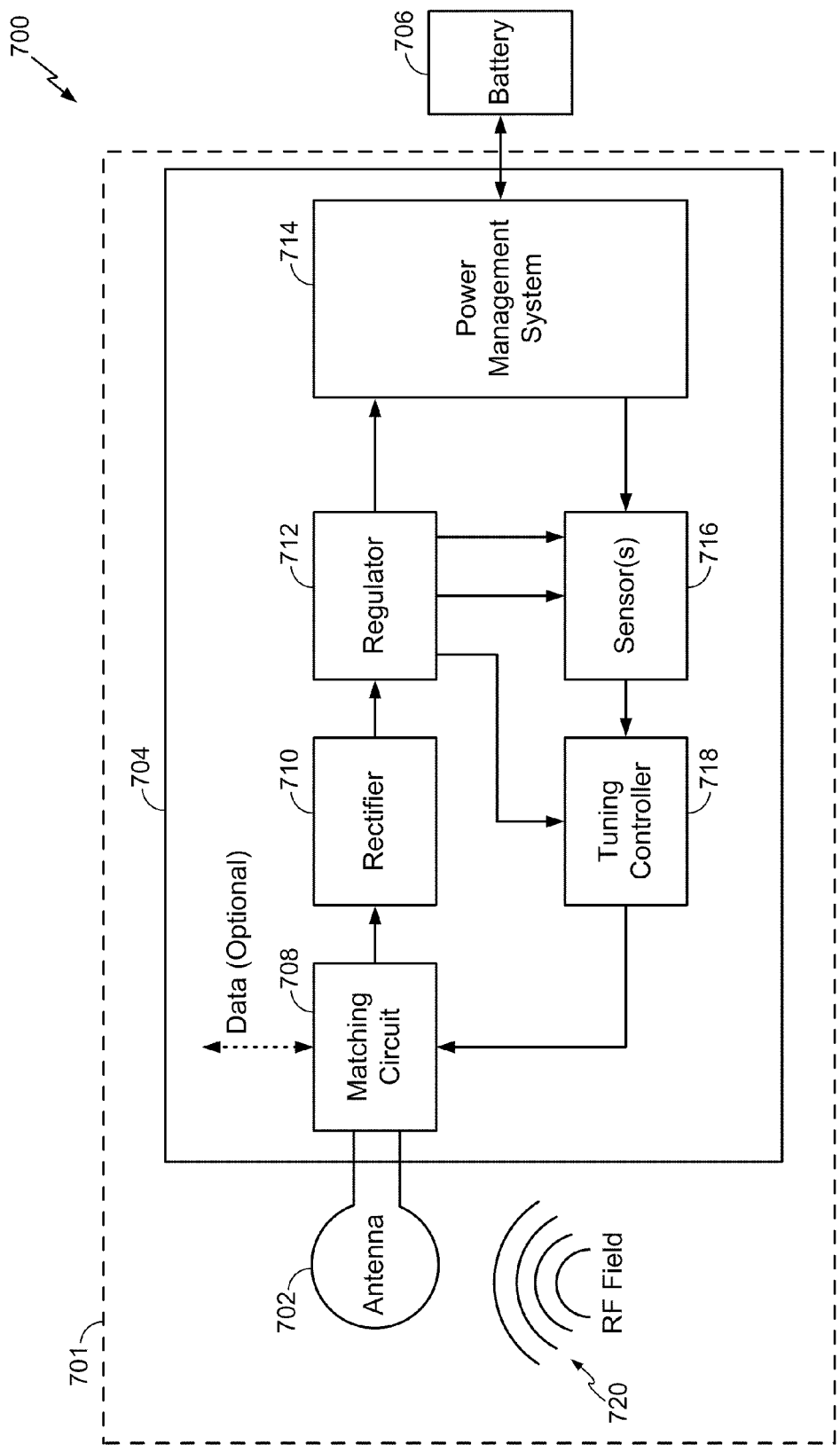
FIG. 7 depicts a block diagram of a portion of an electronic device, in accordance with an exemplary embodiment of the present invention.

FIG. 7 depicts a block diagram of a portion of an electronic device 700, which may comprise any known and suitable electronic device. As non-limiting examples, electronic device 700 may comprise a cellular telephone, a portable media player, a camera, a gaming device, a navigation device, a headset (e.g., a Bluetooth headset), a tool, a toy, or any combination thereof. As described more fully below, electronic device 700 may be configured to wirelessly receive power transmitted from another electronic device, such as a wireless charger. More specifically, a receiver 701 within electronic device 700 may be configured to receive wireless power transmitted from a device configured to transmit wireless power. Additionally, electronic device 700 may be configured to charge a battery 706 of electronic device 700 with received power.

Furthermore, electronic device 700 may be configured to wirelessly communicate with at least one other electronic device. More specifically, as an example, electronic device 700 may be configured to establish communication link (e.g., a near-field communication (NFC) link) with at least one other electronic device and, upon establishing the communication link, may wirelessly receive data (e.g., audio files, data files, or video files) from the at least one other electronic device, wirelessly transmit data to the at least one other electronic device, or both.

Electronic device 700 may include a receiver 701 comprising an antenna 702 that is operably coupled to receive circuitry 704 and configured for receiving an RF field 720, which may comprise, for example, wireless power, a data signal, or a combination thereof. Receive circuitry 704 may include a matching circuit 708, a rectifier 710, and a regulator 712. As will be understood by a person having ordinary skill in the art, matching circuit 708 may be configured to match the impedance of receive circuitry 704 to antenna 702. As will also be understood by a person having ordinary skill in the art, rectifier 710 may be configured for converting an AC voltage to a DC voltage and regulator 712 may be configured for outputting a regulated voltage level. As illustrated in FIG. 7, regulator 712 may be operably coupled to each of a sensor 716, a power management system 714, and a tuning controller 718. Sensor 716 may comprise one or more sensors configured to sense one or more parameter values within receive circuitry 704, as described more fully below. Tuning controller 718 may further be operably coupled to each of sensor 716 and matching circuit 708, and may be configured for conveying one or more tuning values to matching circuit 708, as described more fully below. Furthermore, power management system 714 may be operably coupled to each of sensor 716 and battery 706 and may be configured to control operation of one or more components within receiver 701.

As will be understood by a person having ordinary skill in the art, the efficiency of wireless power transfer, via near-field resonance, depends at least partially on a degree of coupling between a transmitter (e.g., transmitter 104) and a receiver (e.g., receiver 701), which are positioned within a near-field of one another. Further, the degree of coupling between a transmitter and a receiver may be dependent on one or more conditions, which may vary, may be unpredictable, or both. For example only, the degree of coupling between a transmitter and a receiver may be dependent on a type of transmitter, a type of receiver, relative positions of the transmitter and receiver, frequency fluctuations associated with the transmitter and/or the receiver, temperature fluctuations associated with the transmitter and/or the receiver, the existence of other materials within a vicinity of the transmitter and/or the receiver, environmental variables, or any combination thereof.

Various exemplary embodiments of the present invention described herein are directed to increasing the wireless power charging efficiency of receiver 701. According to one exemplary embodiment, electronic device 700 and, more specifically, receiver 701, may be configured for sensing and, optionally, tracking various parameters (e.g., voltage levels or current levels) associated with receive circuitry 704. Further, receiver 701 may be configured for monitoring data, which is related to battery 706. The parameters, the battery data, or a combination thereof may be used for determining the charging efficiency of receiver 701. Further, in response to one or more sensed parameters, receiver 701 may be configured for tuning antenna 702 to enable for an optimal supply of power to battery 706.

With continued reference to FIG. 7, power management system 714 may be configured to transmit data (i.e., data related to battery 706) to sensor 716. More specifically, for example, power management system 714 may be configured to transmit data to sensor 716 relating to a charging level of battery 706, the type of battery 706, a number of charging cycles completed by battery 706, or any combination thereof. Further, sensor 716 may be configured to sense voltage levels at various locations within receiver 701, current levels at various locations within receiver 701, or any combination thereof. More specifically, sensor 716 may be configured to sense a voltage level being supplied from regulator 712 to battery 706, a current level being supplied from regulator 712 to battery 706, or any combination thereof. In addition, it is noted that sensor 716 may be configured to measure an average of one or more sensed parameters, monitor (i.e., track) variations of one or more sensed parameters, or any combination thereof. Sensor 716 may further be configured to transmit sensed data to tuning controller 718.

In response to data received from sensor 716, tuning controller 718 may be configured to execute one or more algorithms to generate one or more tuning values, which may be utilized to tune antenna 702 for maintaining an optimal supply of power to battery 706. It is noted that the one or more algorithms may be chosen to suit a particular application. As one example, tuning controller 718 may comprise a proportional-integral-derivative (PID) controller. As will be understood by a person having ordinary skill in the art, a PID controller may be configured to, upon receipt of one or more input signals (i.e., data) from sensor 716, execute a PID algorithm and output one or more tuning values. As another example, tuning controller 718 may be configured to, upon receipt of one or more input signals (i.e., data) from sensor 716, execute a successive approximation algorithm to generate one or more tuning values, as will also understood by a person having ordinary skill in the art. Furthermore, after determining one or more tuning values, tuning controller 718 may be configured to transmit one or more signals (e.g., control signals) to matching circuit 708 indicative of the one or more tuning values. Upon receipt of the one or more signals, matching circuit 708, and more specifically, an antenna tuning unit 720 (see FIG. 8) may be configured to tune antenna 702 accordingly to enable for an optimal supply of power to battery 706.

Figure 8:
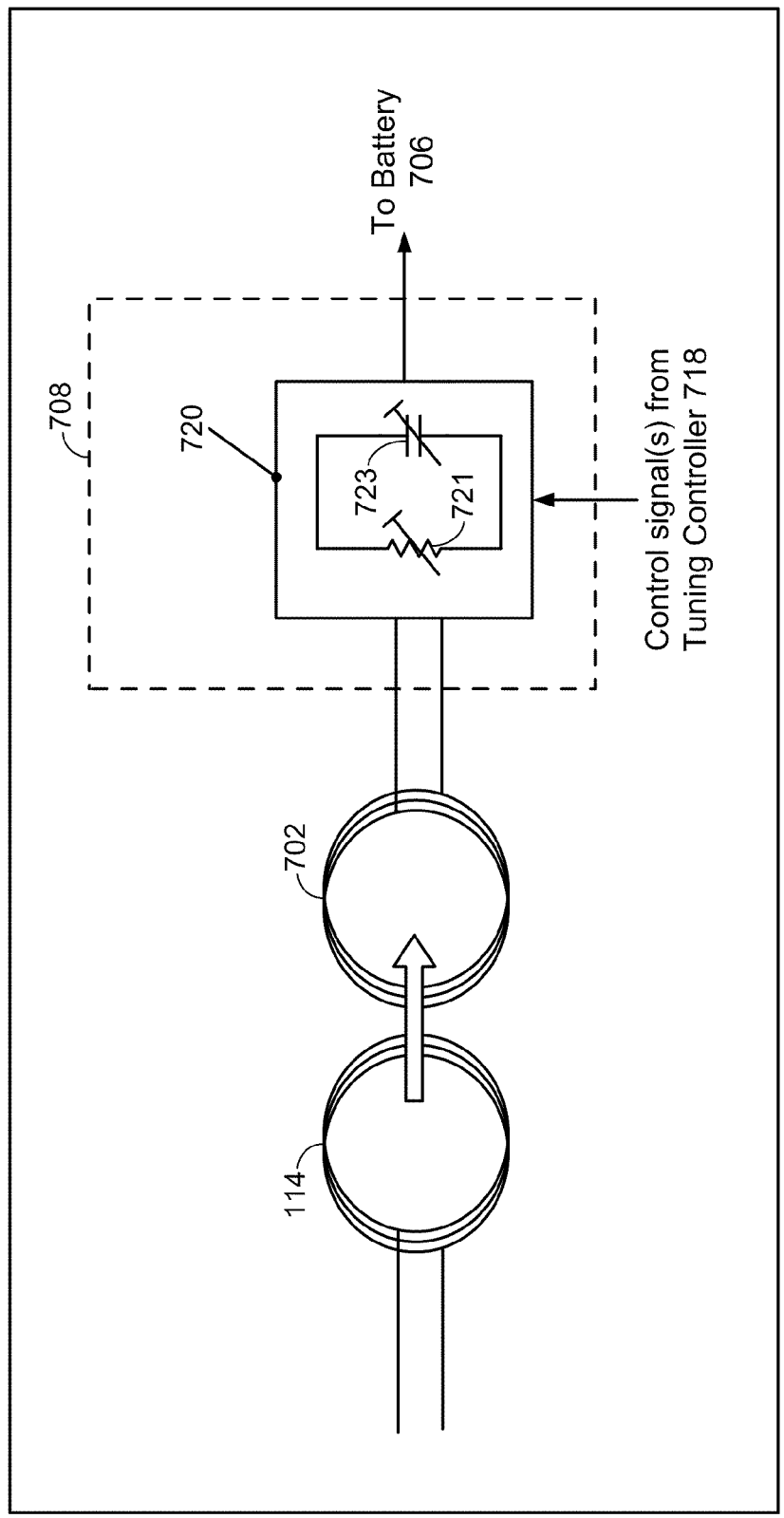
FIG. 8 illustrates an antenna tuning unit, according to an exemplary embodiment of the present invention.

FIG. 8 illustrates an example of antenna tuning unit 720, which may be coupled to receive antenna 702 and may include one or more variable resistors 721, one or more variable capacitors 723, or any combination thereof. Antenna tuning unit 720 may be configured to receive one or more signals from tuning controller 718 and, in response thereto, may tune antenna 702 accordingly to enable for an optimal supply of power to battery 706.

A contemplated operation of electronic device 700 will now be described. Initially, antenna 702 may receive a signal, which, according to this example, comprises wireless power. Thereafter, antenna 702 may convey the received signal to matching circuit 708, which may convey an AC component of the received signal to rectifier 710. Upon receipt of the signal, rectifier 710 may extract a DC component from the signal and, thereafter, convey the DC component to voltage regulator 712. Voltage regulator 712 may then convey a voltage to power management system 714, which may then convey the voltage to battery 706 for charging thereof. Furthermore, at anytime during operation, sensor 716 may sense one or more parameters within receiver 701. For example, sensor 716 may sense a voltage level being supplied from regulator 712 to battery 706, a current level being supplied from regulator 712 to battery 706, or any combination thereof. Furthermore, sensor 716 may monitor (i.e., track) variations of one or more sensed parameters, compute averages of one or more sensed parameters, or any combination thereof. Moreover, as mentioned above, data, which relates to battery 706, may be conveyed from power management system 714 to sensor 716. Furthermore, sensor 716 may convey data (e.g., data related to battery 706 and/or sensed parameters) to tuning controller 718, which may then perform one or more suitable algorithms to determine one or more tuning values to enable for an optimal supply of power to battery 706. Thereafter, tuning controller 718 may convey one or more signals indicative of the determined one or more tuning values to matching circuit 708. Upon receipt of the one or more signals, matching circuit 708 may tune antenna 702 accordingly.

Figure 9:
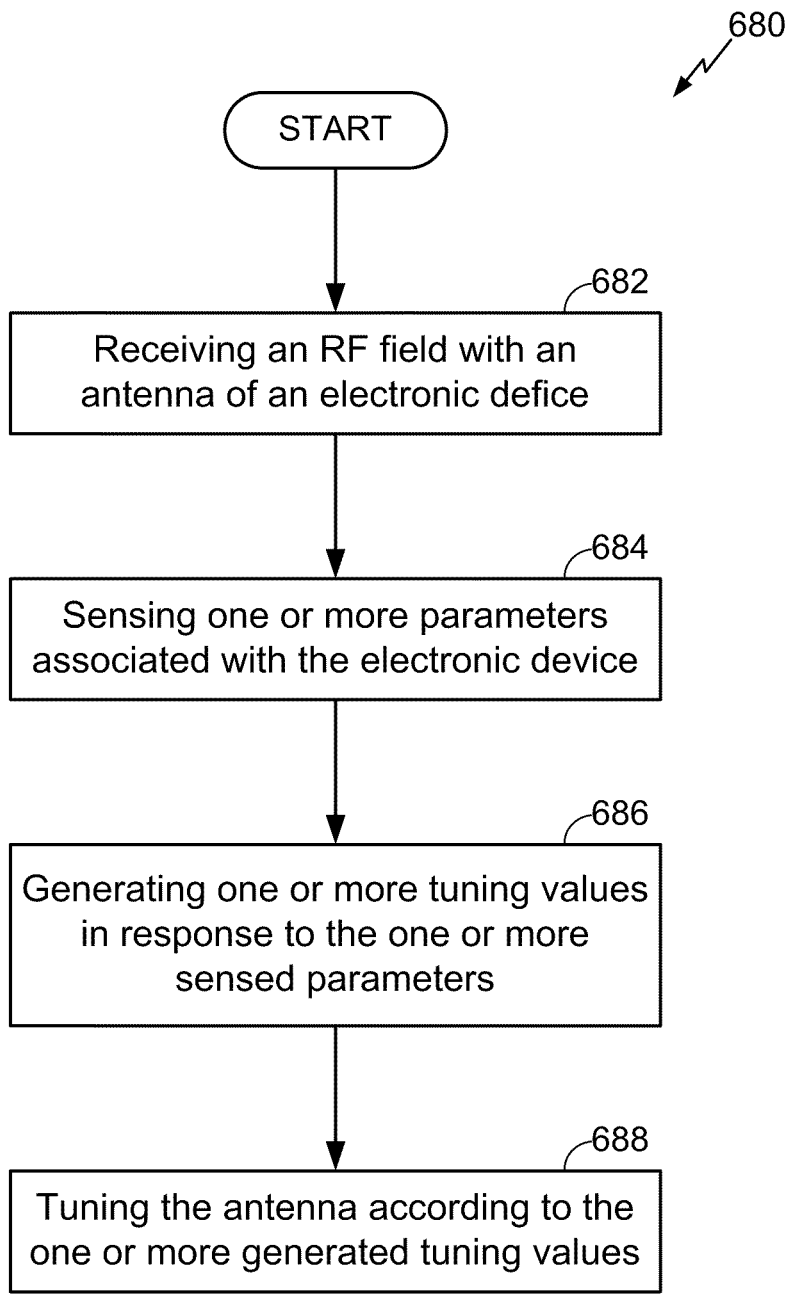
FIG. 9 is a flowchart illustrating a method, according to an exemplary embodiment of the present invention.

FIG. 9 is a flowchart illustrating a method 680, in accordance with one or more exemplary embodiments. Method 680 may include receiving an RF field with an antenna of an electronic device (depicted by numeral 682). Method 680 may further include sensing one or more parameters associated with the electronic device (depicted by numeral 684). Further, method 680 may include generating one or more tuning values in response to the one or more sensed parameters (depicted by numeral 686). Moreover, method 680 may include tuning the antenna according to the one or more generated tuning values (depicted by numeral 688). It is noted that method 680 may be repeated as required to maintain an optimal supply of power to a battery associated with an electronic device.

Exemplary embodiments of the present invention, as described above, may enable for an optimal supply of power to battery 706 under potentially variable charging conditions (e.g., movement of electronic device 700, environmental variables, fluctuations in the transmitter characteristics, fluctuations in the receiver characteristics, etc.). It is noted that the tracking and adaptive features of the exemplary embodiments described above may reduce the impact of variable charging conditions and, therefore, charging times may be reduced, which may be a benefit to a user.

Figure 10:
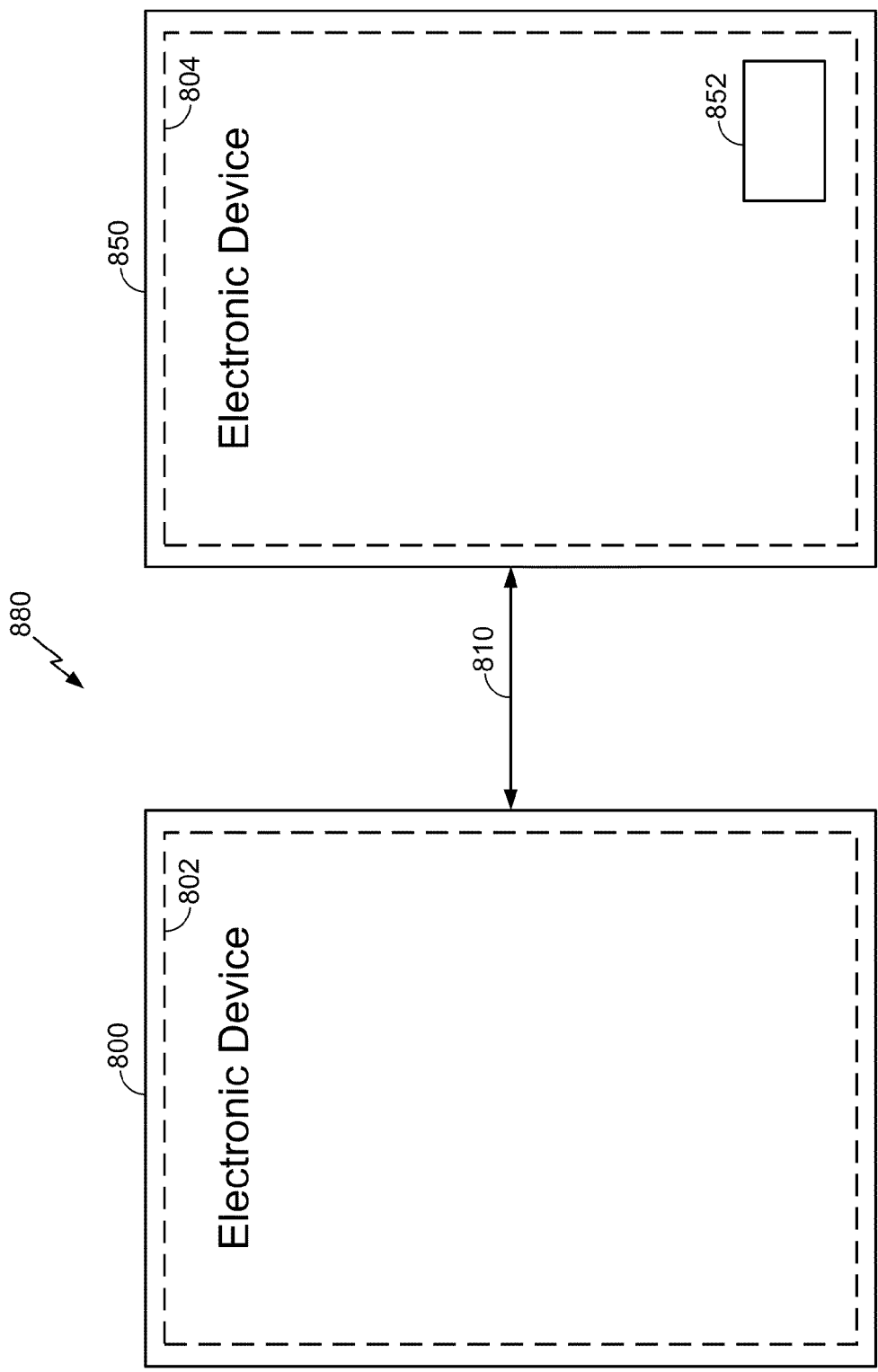
FIG. 10 illustrates a system including a plurality of electronic devices, in accordance with an exemplary embodiment of the present invention.
Figure 11:
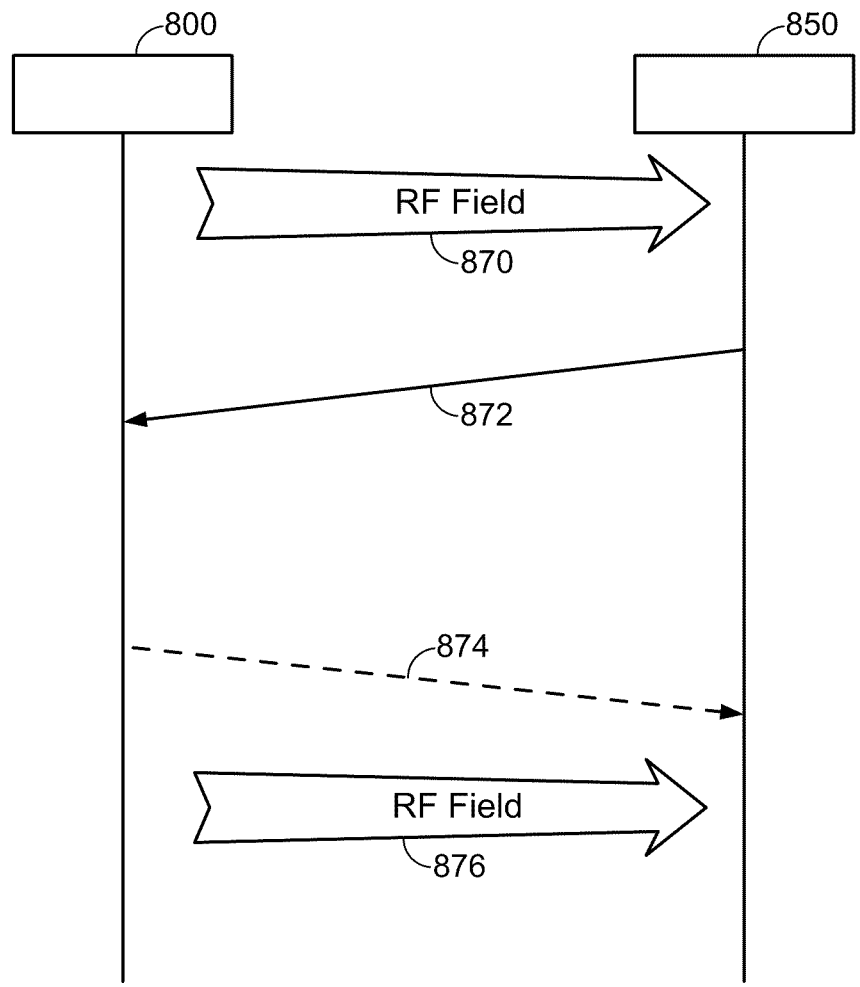
FIG. 11 illustrates a system process diagram, according to an exemplary embodiment of the present invention.

In addition to the exemplary embodiments described above wherein a passive device may be configured to tune its associated antenna to enable for increased charging efficiency, other exemplary embodiments of the present invention, as described below with reference to FIGS. 10 and 11, are directed to tuning an antenna of an active device to enable for increased charging efficiency.

FIG. 10 illustrates a system 880 including a first electronic device 800, which may comprise any known and suitable charger configured to transmit wireless power. First electronic device 800 may include at least one transmit antenna 802 configured to wirelessly transmit power to at least one chargeable device (e.g., second electronic device 850). More specifically, transmit antenna 802 and an associated transmitter, such as transmitter 104 of FIG. 2, may be configured to transmit wireless power to a receiver within an associated near-field region. It is noted that first electronic device 800 may also be referred to herein as a "charger" or an "active device."

System 880 further includes a second electronic device 850, which may comprise any known and suitable chargeable device configured to receive wireless power. As non-limiting examples, electronic device 850 may comprise a cellular telephone, a portable media player, a camera, a gaming device, a navigation device, a headset (e.g., a Bluetooth headset), a tool, a toy, or any combination thereof. Electronic device 850 may include at least one receive antenna 804 configured to receive power wirelessly transmitted from a suitable wireless power source (e.g. first electronic device 800). More specifically, according to one exemplary embodiment, antenna 804 and an associated receiver, such as receiver 108 of FIG. 2, may be configured to receive wireless power transmitted from a wireless power source within an associated near-field region. Additionally, electronic device 850 may be configured to charge a battery 852 with received power. It is noted that second electronic device 850 may also be referred to herein as a "chargeable device" or a "passive device." It is further noted that second electronic device 850 may comprise electronic device 700, as described above with reference to FIGS. 7 and 8.

Furthermore, each of electronic device 800 and electronic device 850 may be configured to wirelessly communicate with at least one other electronic device via associated antennas. More specifically, as an example, electronic device 800 may be configured to establish a communication link with at least one other electronic device and, upon establishing the communication link, may wirelessly receive data (e.g., audio files, data files, or video files) from the at least one other electronic device, wirelessly transmit data to the at least one other electronic device, or both. Similarly, electronic device 850 may be configured to establish a communication link with at least one other electronic device and, upon establishing the communication link, may wirelessly receive data (e.g., audio files, data files, or video files) from the at least one other electronic device, wirelessly transmit data to the at least one other electronic device, or both. As illustrated in FIG. 10, a communication link 810 exists between first electronic device 800 and second electronic device 850.

With reference to FIGS. 10 and 11, a contemplated operation of system 880 will now be described. Initially, first electronic device 800 may transmit an RF field (depicted by numeral 870 in FIG. 11), which may be received by second electronic device 850. Furthermore, upon receipt of RF field 870, second electronic device 850 may be configured to monitor a charging efficiency of system 880. For example, second electronic device 850 may be configured to monitor an amount of energy received from RF field 870. More specifically, second electronic device 850 may be configured for sensing and tracking various parameters (e.g., voltage levels, current levels, temperatures, and frequencies) associated with components or signals within electronic device 850 to determine an amount of energy received from RF field 870. Furthermore, as an example, second electronic device 850 may be configured to compare the amount of energy received from RF field 870 to one or more benchmark values to determine a charging efficiency of system 880. As one example, second electronic device 850 may be configured to receive a data signal from first electronic device 800 indicative of an amount of energy transmitted with RF field 870. Thereafter, to determine a charging efficiency of system 880, second electronic device 850 may compare the amount of energy received from RF field 870 to the amount of energy transmitted with RF field 870.

In the event second electronic device 850 determines that the charging efficiency of system 880 may be improved, or that the received RF field is inadequate for effectively charging battery 852, second electronic device 850 may be configured transmit a signal (depicted by numeral 872 in FIG. 11) to first electronic device 800, via link 810 and according to any suitable communication means (e.g., NFC), requesting a modification to the transmitted RF field. As one example, second electronic device 850 may be configured transmit a signal to first electronic device 800 requesting that the tuning of antenna 802 be modified in a desired manner. Desired modifications of antenna 802 may include, but are not limited to, a change in center frequency, a change in the Q factor, a change in the impedance, a change in directionality, a change in the number of turns selected, or any combination thereof. As another example, second electronic device 850 may be configured transmit a signal to first electronic device 800 requesting that the amplitude of the transmitted RF field be increased or decreased. It is noted that the received RF field may be inadequate for one or more various reasons, such as, for example only, the current of the received RF field is too high or too low to charge battery 852, the voltage of the received RF field is too high or too low to charge battery 852, or any combination thereof.

Upon receipt of signal 872 (i.e., the request) from second electronic device 850, first electronic device 800 may be configured to determine whether compliance, or partial compliance with the request is feasible. Determining whether compliance is feasible may at least partially depend on various factors, such as, for example only, regulatory constraints, available resources, or any combination thereof. It is noted that if first electronic device 800 determines that it cannot comply with the request, the charging efficiency of system 880 will be no worse. On the other hand, if first electronic device 800 can at least partially comply with the request, the charging efficiency of system 880 may be improved.

Regardless of whether first electronic device 800 determines that it can comply fully with the request, cannot comply with the request, or that is can only partially comply with the request, first electronic device 800 may transmit a reply signal (depicted by numeral 874 in FIG. 11) to second electronic device 850 informing second electronic device 850 of its determination and, optionally, the reason for its determination. It is noted that reply signal 874 may be useful for second electronic device 850 for the purposes of ceasing further requests or for deciding to power down one or more associated components if it is determined that more effective charging is not possible.

In the event that first electronic device 800 at least partially complies with the request, an RF field comprising wireless power (depicted by numeral 876 in FIG. 11), which may have one or more modified parameters (e.g., frequency, Q factor, directionality, amplitude, etc.), may be transmitted to second electronic device 850.

Figure 12:
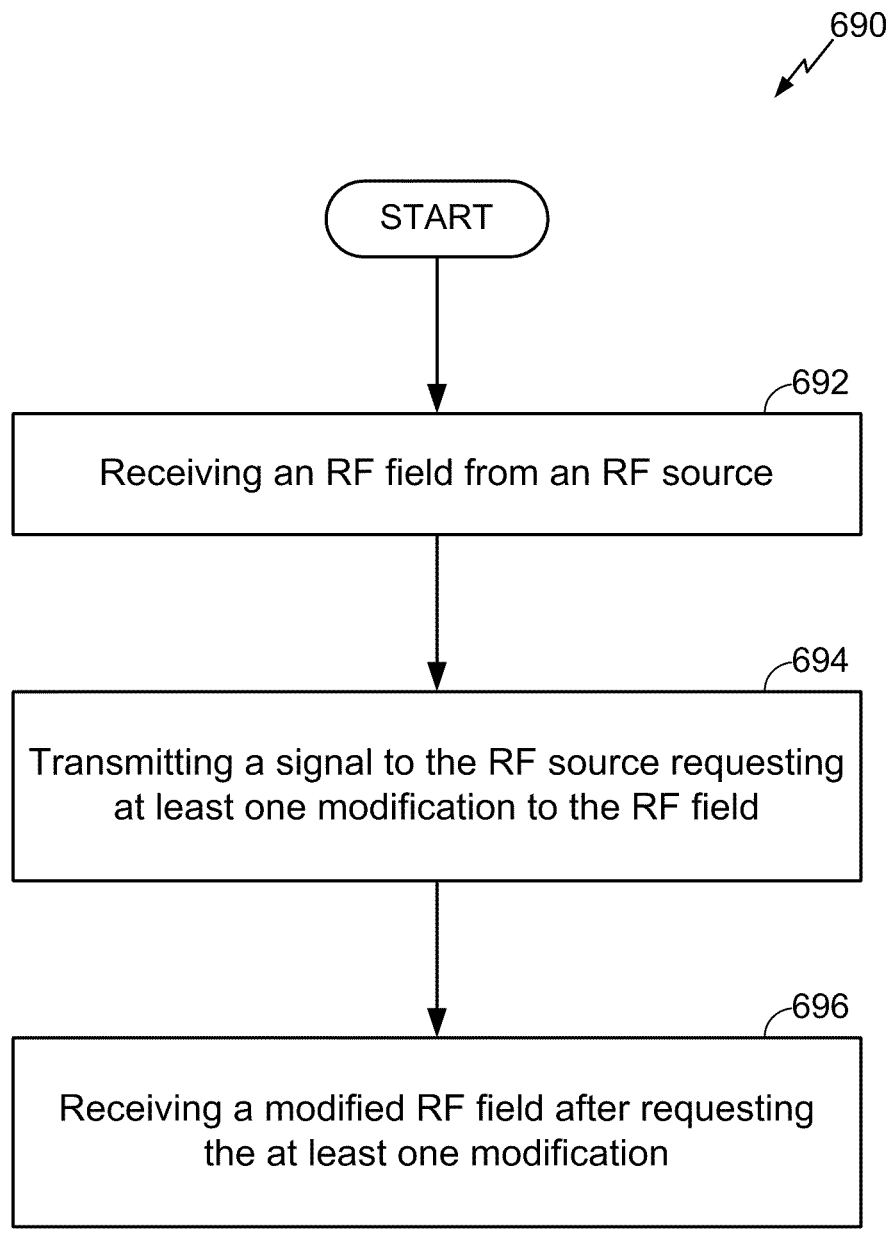
FIG. 12 is a flowchart illustrating another method, according to an exemplary embodiment of the present invention

FIG. 12 is a flowchart illustrating a method 690, in accordance with one or more exemplary embodiments. Method 690 may include receiving an RF field from an RF source (depicted by numeral 692). Method 690 may further include transmitting a signal to the RF source requesting at least one modification to the RF field (depicted by numeral 694). Furthermore, method 690 may further include receiving a modified RF field after requesting the at least one modification. (depicted by numeral 696)

The various exemplary embodiments described above with reference to FIGS. 10-12 enable for wireless charging of a chargeable device in situations that may otherwise be difficult, if not impossible. As one example, in a case wherein mismatch between a receive antenna (e.g., antenna 804) and transmit antenna (e.g., antenna 802) results in low charging efficiency, the transmit antenna may be tuned to enable for increased efficiency. As another example, in a case wherein a chargeable device (e.g., second electronic device 850) is too far from, or too close too, an RF source (e.g., first electronic device 800) for efficient coupling, a power level of a transmitted RF field may be either decreased or increased to enable for increased coupling.

Figure 13:
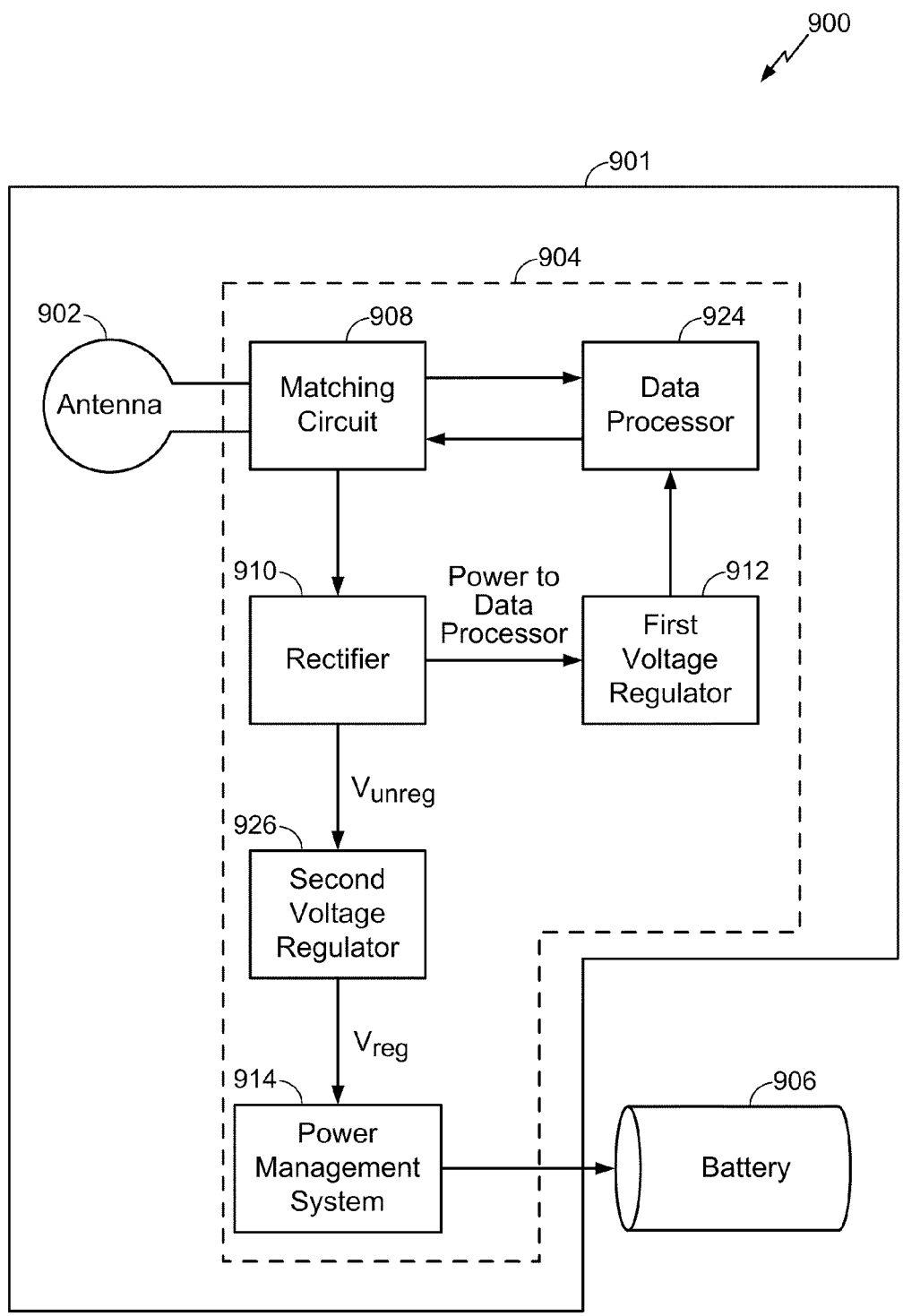
FIG. 13 is a portion of another electronic device, according to an exemplary embodiment of the present invention.

FIG. 13 depicts a block diagram of another electronic device 900, which may comprise any known and suitable electronic device. Electronic device 900 may comprise, for example only, a cellular telephone, a portable media player, a camera, a gaming device, a navigation device, a headset (e.g., a Bluetooth headset), a tool, a toy, or any combination thereof. As described more fully below, electronic device 900 may be configured to wirelessly receive an RF field transmitted from an RF source. More specifically, according to one exemplary embodiment, a receiver 901 of electronic device 900 may be configured to receive wireless power transmitted from a wireless charger. Furthermore, according to another exemplary embodiment, electronic device 900 may be configured to wirelessly communicate with at least one other electronic device via receiver 901. More specifically, as an example, electronic device 900 may be configured to establish a communication link (e.g., near-field communication (NFC) link) with at least one other electronic device and, upon establishing the communication link, may wirelessly receive data (e.g., audio files, data files, or video files) from the at least one other electronic device via suitable means (e.g. NFC means), wirelessly transmit data to the at least one other electronic device via suitable means (e.g. NFC means), or both.

As will be understood by a person having ordinary skill in the art, while operating in a passive mode, receiver 901 may extract a sufficient amount of energy from a received RF field (i.e., a data signal) to enable receiver 901 to power communication circuitry configured for passively communicating with a transmitting device (e.g., transmitter 104 of FIG. 2).

Furthermore, a received RF field associated with a data signal may typically generate energy beyond what is required to power communication circuitry within a receiver. In accordance with one or more exemplary embodiments of the present invention, electronic device 900 and, more specifically, receiver 901, may be configured for receiving a data signal, via suitable communication means, extracting available energy from the data signal, and conveying the extracted energy to battery 906.

As illustrated in FIG. 13, receiver 901 includes antenna 902, which is operably coupled to receive circuitry 904 and configured for receiving wireless power. Receive circuitry 904 may include a matching circuit 908, a rectifier 910, a first voltage regulator 912, and a data processor 924. Matching circuit 908 may be operably coupled to each of rectifier 910 and data processor 924. Furthermore, first voltage regulator 912 may be operably coupled to each of data processor 924 and rectifier 910. Receive circuitry 904 may further include a second voltage regulator 926 operably coupled to each of rectifier 910 and a power management system 914, which may comprise a power management integrated circuit. Power management system 914 may be operably coupled to a battery 906. For example only, second voltage regulator 926 may comprise a switching regulator.

A contemplated operation of receiver 901 will now be described. Initially, antenna 902 may receive a data signal via suitable means (e.g., NFC means) and, thereafter, convey the received signal to matching circuit 908. Matching circuit 908 may thereafter convey an AC component of the received signal to each of data processor 924 and rectifier 910. Upon receipt of the signal, rectifier 910 may extract a DC component from the signal and convey the DC component to first voltage regulator 912. First voltage regulator 912 may then convey a voltage to data processor 924 for powering components therein.

Furthermore, rectifier 910 may convey an unregulated voltage $V_{unreg}$ to second voltage regulator 926. Furthermore, second voltage regulator 926 may be configured to output a regulated voltage $V_{reg}$, which may have an amplitude suitable for charging battery 906. It is further noted that the amplitude of unregulated voltage $V_{unreg}$ transmitted from rectifier 910 to second voltage regulator 926 may vary depending on the degree of coupling between receiver 901 and an associated transmitter (e.g., transmitter 104 of FIG. 2). Furthermore, the relative positions of receiver 901 and an associated transmitter (e.g., transmitter 104 of FIG. 2), tuning of associated antennas, as well as the existence of other materials within a vicinity of the transmitter and/or receiver 901 may affect the amplitude of unregulated voltage $V_{unreg}$.

Upon receipt of regulated voltage $V_{reg}$, power management system 914 may convey power to battery 906 for charging thereof. It is noted that second voltage regulator 926 may convey regulated voltage $V_{reg}$ to an input pin (not shown) of power management system 914 in a similar manner as if a wired charger (not shown) was conveying power to power management system 914.

Figure 14:
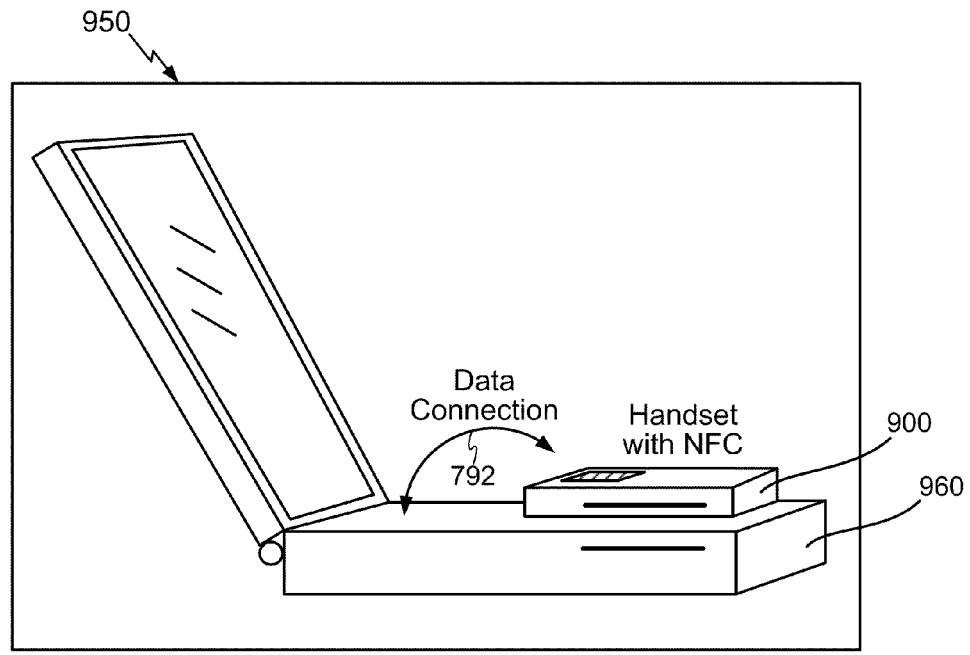
FIG. 14 illustrates another system including a plurality of electronic devices, according to an exemplary embodiment of the present invention.

FIG. 14 illustrates a system 950 including electronic device 900 positioned proximate an electronic device 960, which may be configured for transmitting data, via any suitable means, to electronic device 900. Electronic device 900 may be configured to receive an RF field (i.e., a data signal) from electronic device 960 (depicted by arrow 792) and convey the data signal to a data processor (e.g., data processor 924 of FIG. 12). Furthermore, in accordance with one or more of the exemplary embodiments described above, electronic device 900 may be configured to extract available energy from the received RF field and convey the extracted energy to battery 906 (see FIG. 12).

Figure 15:
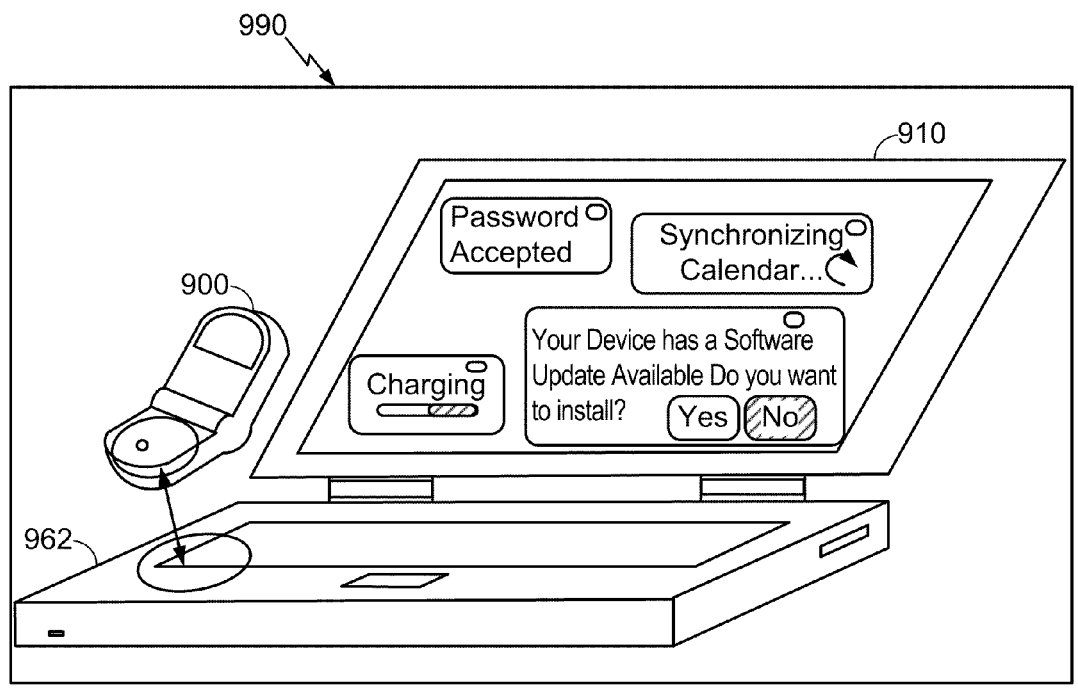
FIG. 15 illustrates yet another system including a plurality of electronic devices, according to an exemplary embodiment of the present invention.

FIG. 15 illustrates another system 990 including electronic device 900 positioned proximate an electronic device 962, which is depicted as a laptop computer. Electronic device 962 may be configured to establish a communication link with electronic device 900 via any suitable means. Further, upon establishing a communication link, electronic device 962 may be configured to transmit an RF field including a data signal (e.g., media files or data files) to electronic device 900. Electronic device 900 may be configured to receive an RF field (i.e., a data signal) from electronic device 962 and convey the data signal to a data processor of electronic device 900 (i.e., data processor 924 of FIG. 12). Moreover, in accordance with one or more of the exemplary embodiments described above, electronic device 900 may be configured to extract available energy from the RF field and convey the extracted energy to battery 906 (see FIG. 12). It is noted that data transfer (e.g., synchronization of files) from one electronic device (e.g., electronic device 962) to another electronic device (e.g., electronic device 900) may require a substantial amount of time and, therefore, a considerable amount of energy may be conveyed to a battery (e.g., battery 906) during the data transfer.

Figure 16:
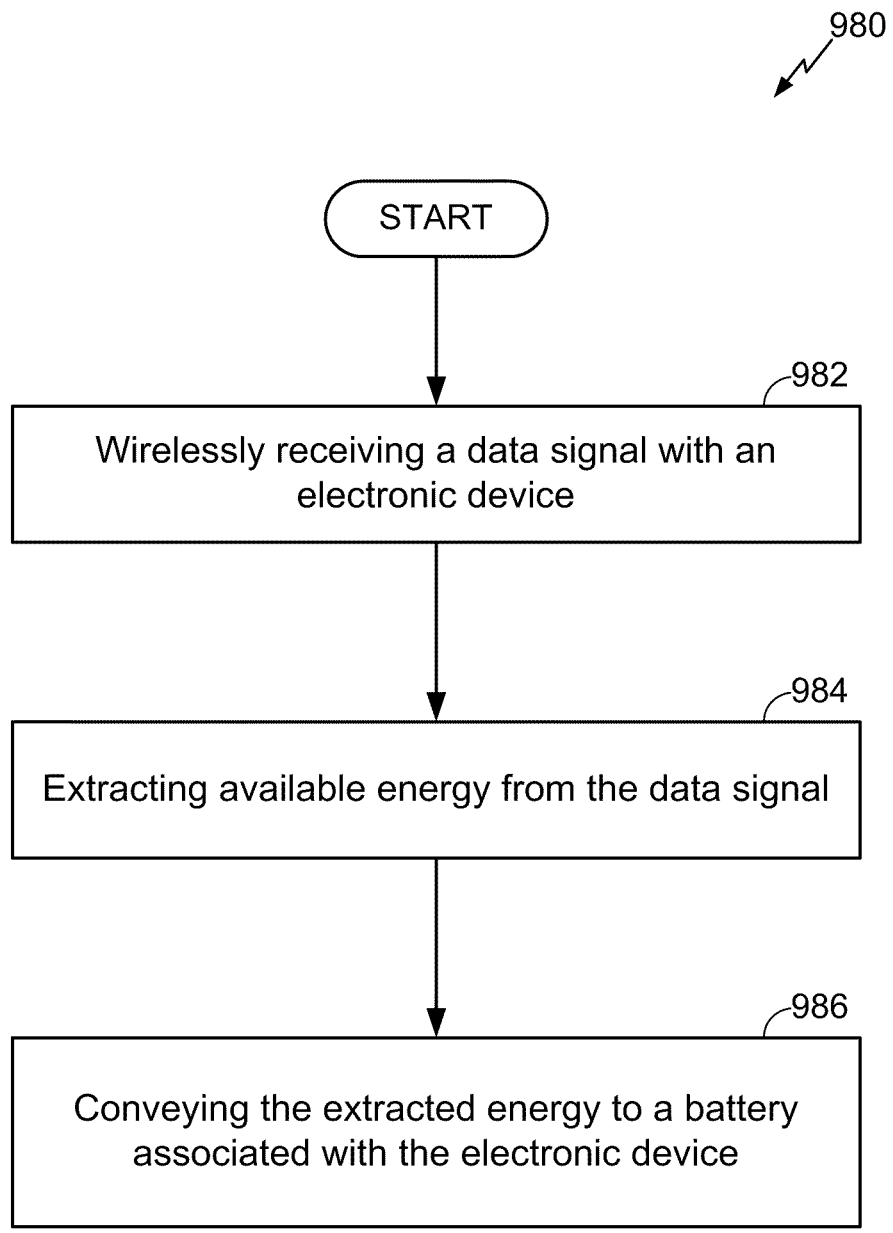
FIG. 16 is a flowchart illustrating another method, according to an exemplary embodiment of the present invention.

FIG. 16 is a flowchart illustrating a method 980, in accordance with one or more exemplary embodiments. Method 980 may include wirelessly receiving a data signal with an electronic device (depicted by numeral 982). Method 980 may further include extracting available energy from the data signal (depicted by numeral 984). Furthermore, method 980 may include conveying the extracted energy to a battery associated with the electronic device (depicted by numeral 986). It is noted that method 980 may be repeated for each data signal received by an electronic device.

It is noted that the exemplary embodiments described with reference to FIGS. 13-16 may be utilized in conjunction with other wireless charging technologies, such as higher power dedicated wireless chargers. However, in a standalone configuration, the exemplary embodiments described with reference to FIGS. 13-16 may enable for low cost, small, and reliable means for charging an electronic device.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the exemplary embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the exemplary embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the exemplary embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the exemplary embodiments shown herein but is to be accorded the widest scope consistent with the principles and novel features disclosed herein.

What is claimed is:

1. A device for receiving charging power wirelessly from a charger, the device comprising:
    an antenna configured to receive the charging power via a wireless field at a level sufficient to charge a battery; and
    a controller configured to generate a tuning value for the charger to increase a level of efficiency of charging power, the controller further configured to send the generated tuning value to the charger, the controller further configured to receive a reply signal from the charger in response to the generated tuning value, the reply signal indicative of a modification to the wireless field, the antenna further configured to couple to a modified wireless field based on the generated tuning value.

2. The device of claim 1, wherein the controller is further configured to generate a proportional-integral-derivative (PID) of a value the tuning value is based on, and/or generate a successive approximation of a value the tuning value is based on.

3. The device of claim 1, further comprising a sensor, wherein the sensor is configured to detect at least one of a type of transmitter sending a signal received by the antenna, a type of the device, relative positions of a transmitter sending a signal received by the antenna and the device, a frequency fluctuation associated with a transmitter sending a signal received by the antenna, a frequency fluctuation associated with the device, a temperature fluctuation associated with a transmitter sending a signal received by the antenna, a temperature fluctuation associated with the device, presence of a material within a wireless field generated by transmitter sending a signal received by the antenna, and an environmental factor within a wireless field generated by transmitter sending a signal received by the antenna.

4. The device of claim 1, wherein the controller generates at least one tuning value based at least in part on an attribute of the battery, wherein the attribute of the battery comprises at least one of a type of the battery, a number of charging cycles of the battery, a charging level of the battery, a voltage level being supplied to the battery, and an amount of current being supplied to the battery.

5. The device of claim 3, wherein the controller is configured to generate a tuning value based in part on the detected parameter.

6. The device of claim 1, comprising a transmitter for sending the tuning value to the charger.

7. The device of claim 1, wherein the controller is configured to determine an average value of or track a variation of a value on which the tuning value is based on.

8. The device of claim 1, comprising receiving circuitry configured to:
    receive a data signal from the charger indicative of an amount of energy within a transmitted wireless field; and
    compare the amount of energy within a transmitted wireless field to a measured amount of energy within a received wireless field.

9. The device of claim 1, comprising a transmitter configured to transmit a data signal to the charger requesting a modification to a wireless field transmitted from the charger to increase efficiency of charging power.

10. The device of claim 1, comprising:
a voltage regulator configured to extract available energy from a received data signal, the power management system configured to convey the extracted energy to the battery.

11. The device of claim 10, comprising a data processor configured to process the received data signal.

12. A method of receiving wireless charging power from a charger, comprising:
receiving the charging power via a wireless field with an antenna of an electronic device;
generating a tuning value for the charger to increase a level of efficiency of charging power;
sending the generated tuning value to the charger;
receiving a reply signal from the charger in response to the generated tuning value, the reply signal indicative of a modification to the wireless field; and
coupling to a modified wireless field based on the generated tuning value.

13. The method of claim 12, wherein sending the generated tuning value comprises requesting a modification to the wireless field.

14. The method of claim 12, wherein sending the generated tuning value comprises transmitting a signal to the charger, the signal including the tuning value.

15. The method of claim 14, wherein receiving a reply signal from the charger comprises receiving a signal from the charger based in part on the tuning value.

16. The method of claim 13, wherein coupling to a modified wireless field comprises coupling to a modified wireless field after requesting the modification to the wireless field.

17. The method of claim 14, comprising tuning an antenna of the charger based in part on the generated tuning value.

18. The method of claim 17, wherein tuning the antenna of the charger comprises modifying at least one of a Q factor of the antenna, an impedance of the antenna, a center frequency transmitted by the antenna, a directionality of the antenna, and a number of turns of the antenna.

19. The method of claim 16, wherein coupling to a modified wireless field comprises coupling to a modified wireless field from the charger after transmitting a signal to the wireless charger requesting the modification to the wireless field.

20. The method of claim 16, wherein coupling to a modified wireless field comprises coupling to a modified wireless field having one of increased power and decreased power.

21. The method of claim 12, comprising:
detecting a parameter associated with a battery associated with the electronic device; and
wherein a generated tuning value is based at least in part on an attribute of the battery associated with the electronic device and wherein the attribute of the battery comprises at least one of a voltage supplied to the battery and an amount of current supplied to the battery.

22. The method of claim 21, wherein generating a tuning value comprises at least one of generating a proportional-integral-derivative (PID) based in part on the detected parameter and generating a successive approximation based in part on the detected parameter.

23. A device, comprising:
means for receiving charging power via a wireless field
means for generating a tuning value for a charger to increase a level of efficiency of charging power;
means for sending the generated tuning value to the charger;
means for receiving a reply signal from the charger in response to the generated tuning value, the reply signal indicative of a modification to the wireless field; and
means for coupling to a modified wireless field based on the generated tuning value.

24. A charger for transmitting power via a wireless field to a wireless power receiver, comprising:
an antenna configured to transmit the power via the wireless field;
a transmitter configured to provide the power to the antenna; and
a receiver configured to receive a data signal from the wireless power receiver comprising a request to modify the wireless field, the transmitter further configured to modify the wireless field based in part on the request and to transmit a reply signal to the wireless power receiver in response to the request, the reply signal indicative of a modification to the wireless field based on the request.

25. A method, comprising:
transmitting charging power via a wireless field to a wireless power receiver;
receiving a data signal from the wireless power receiver comprising a request to modify the wireless field;
modifying the wireless field based in part on the request; and
transmitting a reply signal to the wireless power receiver in response to the request, the reply signal indicative of a modification to the wireless field based on the request.

26. A charger, comprising:
means for transmitting charging power via a wireless field to a wireless power receiver;
means for receiving a data signal from the wireless power receiver comprising a request to modify the wireless field;
means for modifying the wireless field based in part on the request; and
means for transmitting a reply signal to the wireless power receiver in response to the request, the reply signal indicative of a modification to the wireless field based on the request.

27. A computer readable storage medium comprising instructions that, executable by a processor of an apparatus, that cause the apparatus to:
transmit charging power via a wireless field to a wireless power receiver;
receive a data signal from the wireless power receiver comprising a request to modify the wireless field;
modify the wireless field based in part on the request; and
transmit a reply signal to the wireless power receiver in response to the request, the reply signal indicative of a modification to the wireless field based on the request.

28. A non-transitory computer readable storage medium comprising instructions that, executable by a processor of an apparatus, that cause the apparatus to:
receive charging power via a wireless field with an antenna of an electronic device;
generate a tuning value for a charger;
send the generated tuning value to the charger;
receive a reply signal from the charger in response to the generated tuning value, the reply signal indicative of a modification to the wireless field; and
couple to a modified wireless field based on the generated tuning value.

29. The computer readable storage medium of claim 28, wherein sending the generated tuning value comprises requesting a modification to the wireless field.

30. The computer readable storage medium of claim 29, wherein sending the generated tuning value comprises transmitting a signal to the charger, the signal including the tuning value.

31. The device of claim 1, wherein the controller is further configured to generate a tuning value for the antenna.

32. The device of claim 31, further comprising a matching circuit coupled with the controller, the matching circuit configured to tune the antenna based in part on the tuning value for the antenna.

33. The method of claim 12, further comprising:
generating a tuning value for the antenna; and
tuning the antenna based in part on the generated tuning value for the antenna.

34. The device of claim 23, further comprising:
means for generating a tuning value for the means for receiving the modified wireless field; and
means for tuning the receiving means of the modified wireless field based in part on the generated tuning value for the means for receiving the modified wireless field.

35. The computer readable storage medium of claim 28, further comprising instructions causing the apparatus to:
generate a tuning value for the antenna; and
tune the antenna based in part on the generated tuning value for the antenna.

\* \* \* \* \*